United States Patent
Farooq et al.

(10) Patent No.: US 9,120,461 B2
(45) Date of Patent: Sep. 1, 2015

(54) HOOD LATCH AND STRIKER SYSTEM FOR PEDESTRIAN PROTECTION

(71) Applicant: Ford Global Technologies, LLC, Dearborn, MI (US)

(72) Inventors: Iskander Farooq, Novi, MI (US); Mohammed Omar Faruque, Ann Arbor, MI (US); Srinivasan Sundararajan, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 3 days.

(21) Appl. No.: 14/050,669

(22) Filed: Oct. 10, 2013

(65) Prior Publication Data
US 2014/0034407 A1    Feb. 6, 2014

Related U.S. Application Data

(62) Division of application No. 13/151,848, filed on Jun. 2, 2011, now Pat. No. 8,579,068.

(51) Int. Cl.
*B60R 21/38* (2011.01)
*E05B 77/08* (2014.01)
(Continued)

(52) U.S. Cl.
CPC .............. *B60R 21/38* (2013.01); *B60R 21/34* (2013.01); *E05B 77/08* (2013.01); *E05B 79/20* (2013.01); *E05B 83/24* (2013.01); *E05B 81/08* (2013.01); *Y10T 292/68* (2015.04)

(58) Field of Classification Search
CPC ......... E05B 77/08; E05B 79/20; E05B 83/24; E05B 81/08; B60R 21/38; B60R 21/34; Y10T 292/68

USPC ................. 180/274; 292/337, 340, DIG. 14, 292/DIG. 23
See application file for complete search history.

(56) References Cited

U.S. PATENT DOCUMENTS 2,246,789 A * 6/1941 Dall .............................. 292/117
2,256,465 A * 9/1941 Brubaker ........................ 292/28
(Continued)

FOREIGN PATENT DOCUMENTS

| EP | 1494895 A1 | 1/2005 |
| EP | 1582424 A2 | 3/2005 |

(Continued)

OTHER PUBLICATIONS

Lee, Keun; Jung, Han Jo; Bae Han II, "The Study on Developing Active Hood Lift System for Decreasing Pedestrian Head Injury," Hyundai-Kia Motors, Korea, Paper No. 07-0198, 6 pages, date unknown.

(Continued)

*Primary Examiner* — Ruth Ilan
*Assistant Examiner* — Timothy Wilhelm
(74) *Attorney, Agent, or Firm* — Raymond Coppiellie; Price Heneveld LLP

(57) ABSTRACT

A system for releasing and lifting an automobile hood includes a sensor located proximate a front location of an automobile that detects impact with an object. Also included is a hood having a striker pin operably connected to the hood for engaging a rotatable latch, wherein such engagement places the hood in the secured position. Further included is a releasing mechanism operably connected to one of the striker and the latch for lifting a front region of the hood in response to a signal from the sensor.

6 Claims, 10 Drawing Sheets

(51) Int. Cl.
*E05B 83/24* (2014.01)
*B60R 21/34* (2011.01)
*E05B 79/20* (2014.01)
*E05B 81/08* (2014.01)

(56) References Cited

U.S. PATENT DOCUMENTS

| | | | |
|---|---|---|---|
| 3,334,536 A | | 8/1967 | Armstrong |
| 4,249,632 A | | 2/1981 | Lucchini et al. |
| 4,831,356 A | * | 5/1989 | Ito ............................ 340/426.29 |
| 5,997,230 A | | 12/1999 | Dodd et al. |
| 6,050,117 A | | 4/2000 | Weyerstall |
| 6,068,309 A | * | 5/2000 | Jung et al. ................ 292/341.17 |
| 6,092,845 A | * | 7/2000 | Koenig ......................... 292/225 |
| 6,571,901 B2 | | 6/2003 | Lee |
| 6,623,054 B1 | | 9/2003 | Palmquist |
| 7,275,774 B2 | | 10/2007 | Oberheide |
| 7,506,716 B1 | | 3/2009 | Salmon et al. |
| 7,559,399 B2 | * | 7/2009 | Lewis et al. .................... 180/274 |
| 7,730,990 B2 | | 6/2010 | Boggess et al. |
| 7,845,691 B2 | * | 12/2010 | Sundararajan et al. ....... 292/216 |
| 8,573,658 B2 | * | 11/2013 | Kim .............................. 292/201 |

FOREIGN PATENT DOCUMENTS

| | | |
|---|---|---|
| KR | 20020039965 A | 5/2002 |
| KR | 20020039967 A | 5/2002 |

OTHER PUBLICATIONS

"Honda Develops Pop-up Hood for Pedestrian Safety; Reduces Impact to Pedestrians in the Event of a Collision," Honda Motor Co., Ltd. 1, page, Aug. 24, 2004.

\* cited by examiner

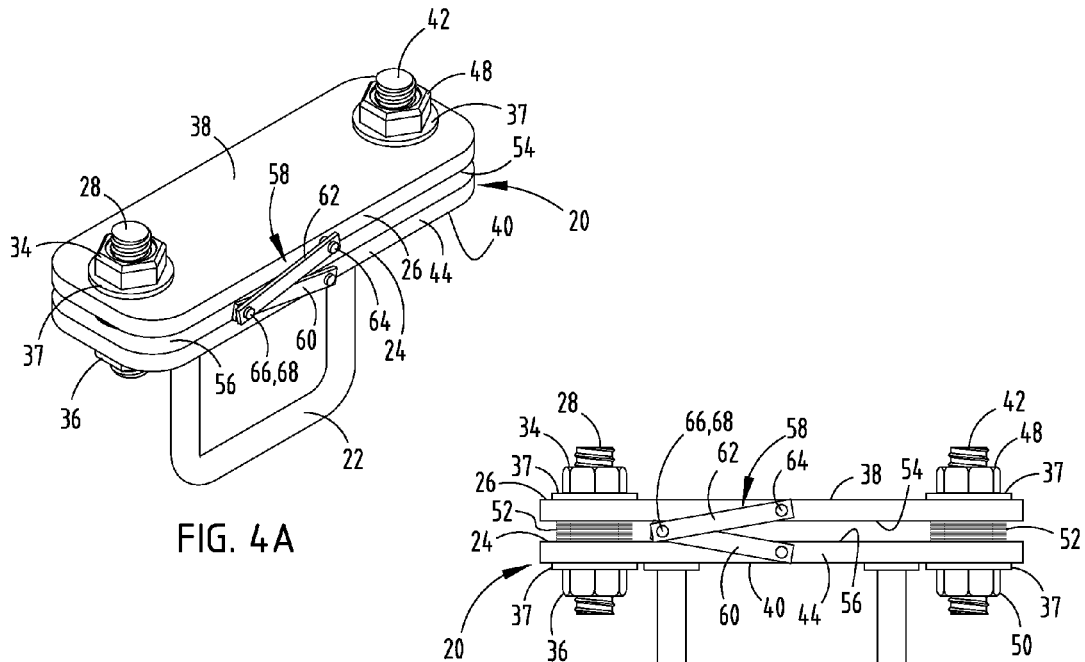
FIG. 4A
FIG. 4B
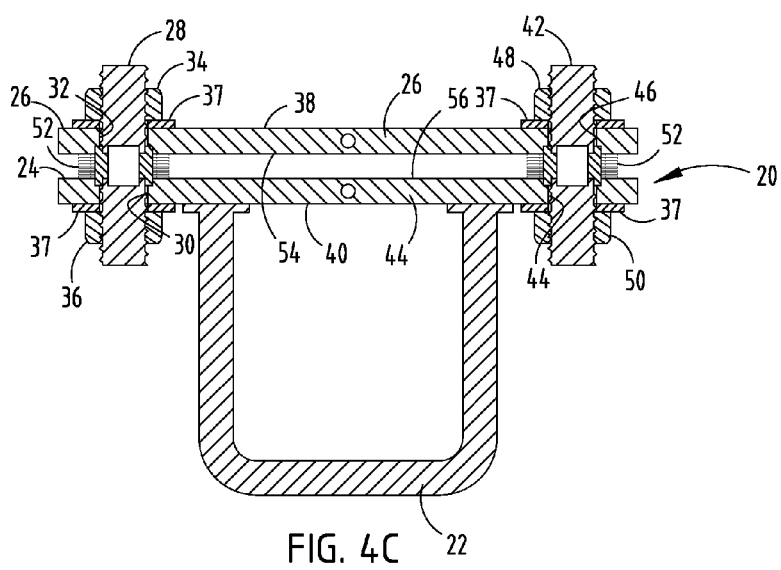
FIG. 4C

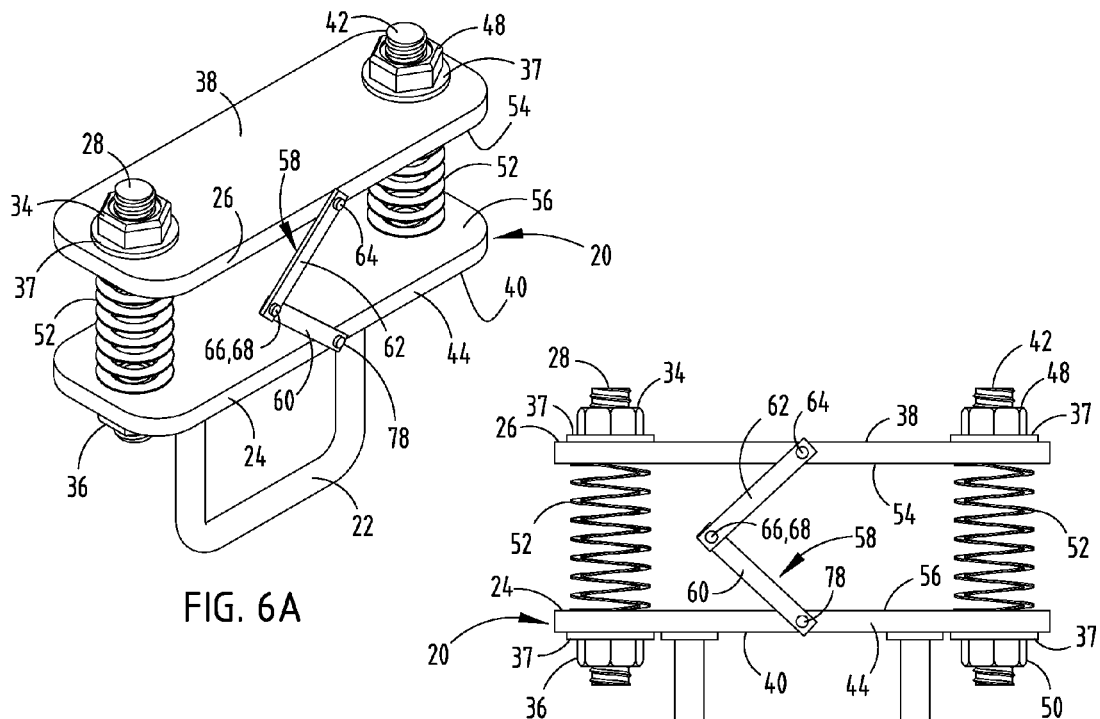
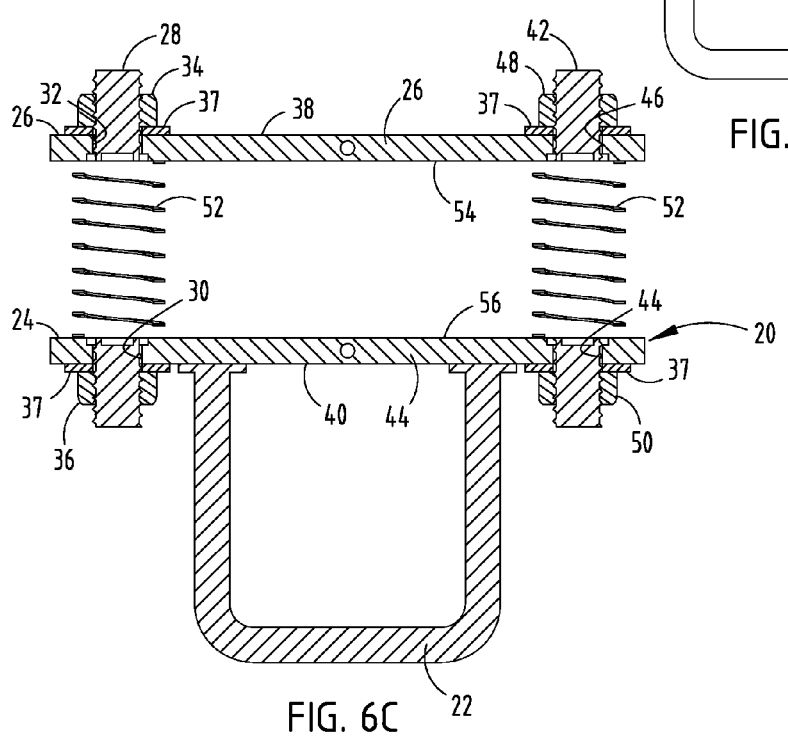

HOOD LATCH AND STRIKER SYSTEM FOR PEDESTRIAN PROTECTION

CROSS-REFERENCE TO RELATED APPLICATION

This application is a divisional of U.S. patent application Ser. No. 13/151,848, filed on Jun. 2, 2011, entitled "HOOD LATCH AND STRIKER SYSTEM FOR PEDESTRIAN PROTECTION," now U.S. Pat. No. 8,579,068. The aforementioned related application is hereby incorporated by reference.

FIELD OF THE INVENTION

The present invention generally relates to an automobile pedestrian safety system, and more particularly to an active hood latch and striker system.

BACKGROUND OF THE PRESENT INVENTION

Certain automobile designs include lower hood heights for styling purposes, particularly in front locations of the hood. As a result, in a fully latched state, the front hood may not have enough clearance from underlying hard points, such as the engine or automobile body. In the event of a collision, such hard points may exacerbate injuries suffered by a pedestrian. Attempts have been made in the industry to modify packages under the hood to address these concerns; however, previous attempts require extensive styling and functional tradeoffs based on packaging requirements.

Accordingly, a system is desired having the aforementioned advantages and solving and/or making improvements on the aforementioned disadvantages.

SUMMARY OF THE PRESENT INVENTION

One aspect of the present invention provides an automobile safety system. Included is a sensor located proximate a front location of an automobile that detects impact with an object. Also included is a hood having a striker for engaging a latch and connected to a mounting plate via a fastener, wherein an electric charge is imparted on the fastener in response to a signal from the sensor, wherein the striker is located proximate a front portion of the hood.

Another aspect of the present invention provides an automobile having a pedestrian safety system. Included is a hood having a striker proximate a front location of the hood. Also included is a sensor located proximate a front location of the automobile that detects impact with a pedestrian. Further included is a latch for engaging the striker. Yet further included is a first cable operably connected to the latch for releasing the striker. Also included is an actuator capable of pulling the first cable in response to a signal from the sensor.

Yet another aspect of the present invention provides a method for lifting an automobile hood. The method includes the step of providing a hood operably connected to the automobile wherein the hood is movable between a secured position and an unsecured position; a sensor located proximate a front location of the automobile; a striker pin operably connected to the hood for engaging a rotatable latch, wherein such engagement places the hood in the secured position; a releasing mechanism operably connected to one of the striker and the latch. The method also includes the step of detecting a collision with an object via the sensor. Further included is the step of actuating the releasing mechanism in response to a signal received from the sensor. Yet further included is the step of lifting a front region of the hood.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 4A is a front perspective view of the safety system in a fastened state;

FIG. 4B is an elevational side view of the safety system in the fastened state;

FIG. 4C is an elevated, side, cross-sectional view of the safety system in the fastened state;

FIG. 6A is a front perspective view of a striker and a mounting plate in a deployed state;

FIG. 6B is an elevated side view of the striker and the mounting plate in the deployed state;

FIG. 6C is an elevated, side, cross-sectional view of the striker and the mounting plate in the deployed state;

DETAILED DESCRIPTION OF EMBODIMENTS

Figure 1:
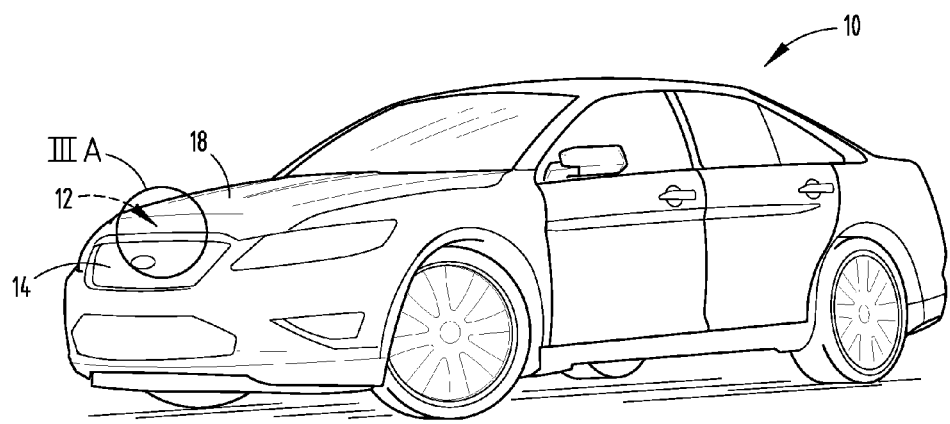
FIG. 1 is a front perspective view of an automobile having an automobile or pedestrian safety system.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
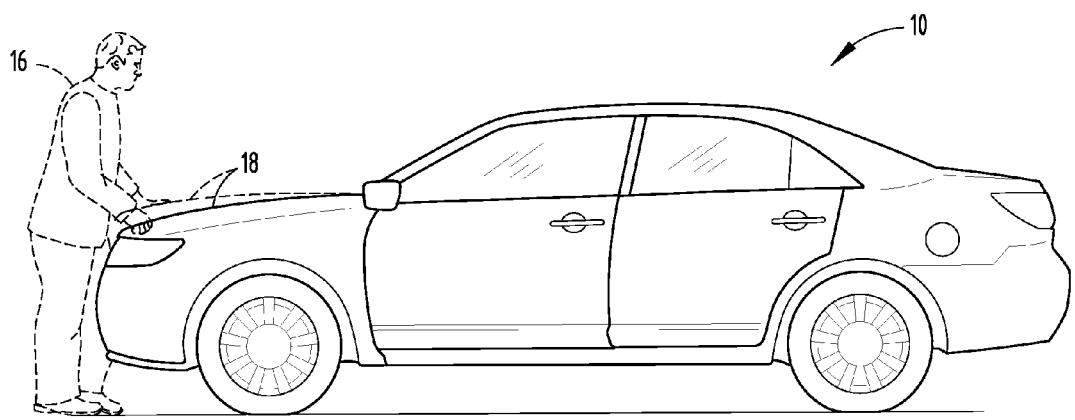
FIG. 2 is an elevated side view of the automobile colliding with a pedestrian.

Referring to FIGS. 1 and 2, an automobile 10 is illustrated having a hood 18 that is operably connected to a front region of the automobile 10 in a conventional manner known in the art. The hood 18 is generally hingedly attached to the automobile 10 about a rear portion of the hood 18. The hood 18 is movable between a secured position, or closed position, and an unsecured position, or an open position.

The automobile 10 is configured to include at least one sensor 14 that is configured to detect various types of collisions between an object 16 and the automobile 10. Specifically, the object 16 that the sensor 14 serves to detect may be a pedestrian 16 located proximate a front location of the automobile 10. Generally, the sensor 14 may be any type of sensor, including, but not limited to, pressure sensors, radar, optical, fiber optic, or infrared sensors. As noted, the sensor 14 is located proximate a front location of the automobile 10, but more specifically the sensor 14 may be imbedded on, or within, the automobile's front bumper.

The automobile 10 is also configured to include an automobile or a pedestrian safety system 12 that is more specifically described as a releasing mechanism 12. The releasing mechanism 12 is actuated in response to a signal received from the sensor 14, and upon such actuation lifts a front region of the hood 18. When the hood 18 is in a secured position, or closed position, a number of hard points between the hood 18 and the engine or automobile body are present. By lifting a front region of the hood 18 in response to a signal from the sensor 14, additional space between the hood 18 and the engine or automobile body is created, thereby reducing or eliminating the hard points to reduce the risk of injuries to a pedestrian 16 during a collision.

Figure 3A:
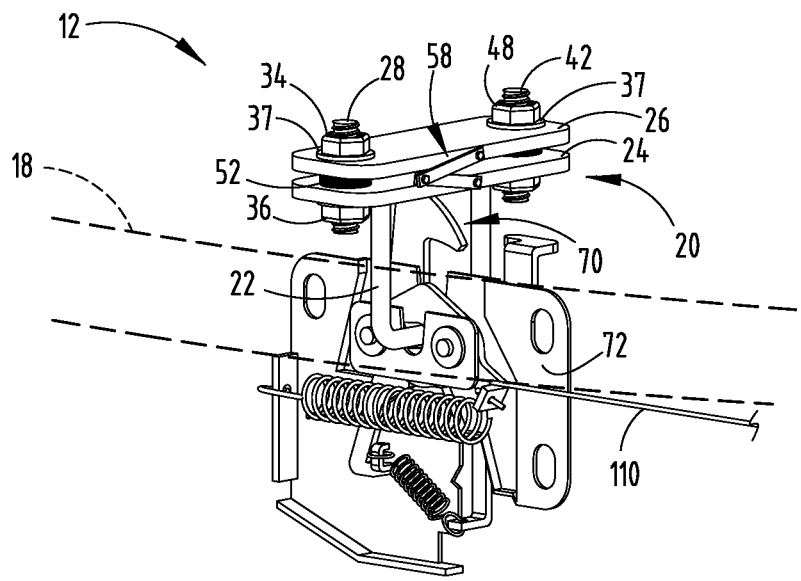
FIG. 3A is a front perspective view of a first embodiment of the safety system.
Figure 3B:
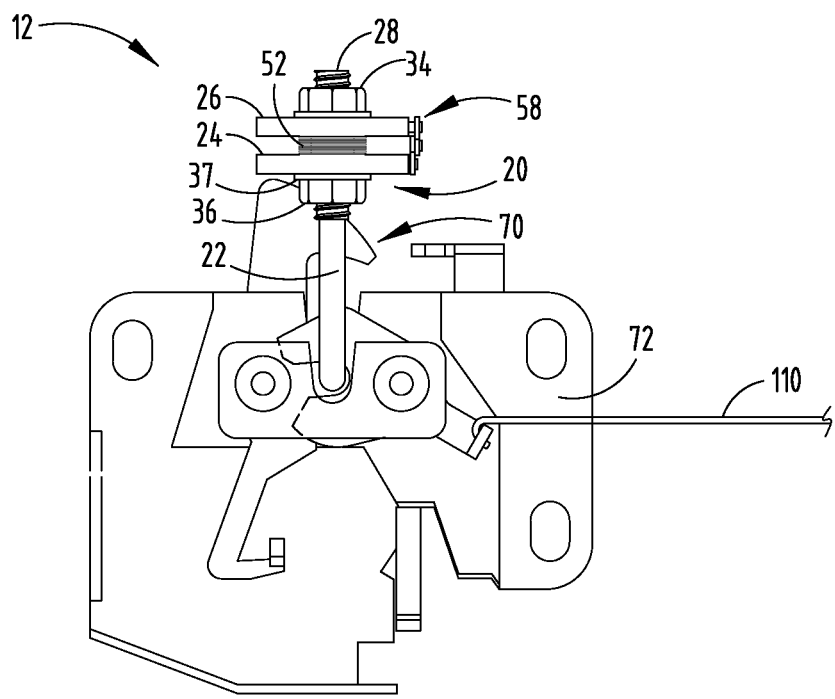
FIG. 3B is an elevated front view of the safety system.
Figure 5A:
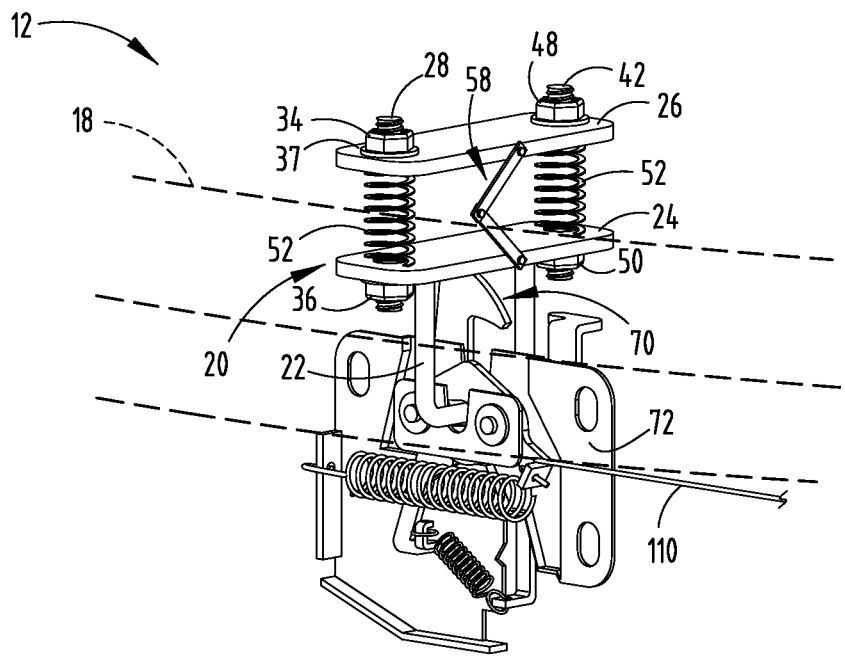
FIG. 5A is a front perspective view of the safety system in a deployed state.
Figure 5B:
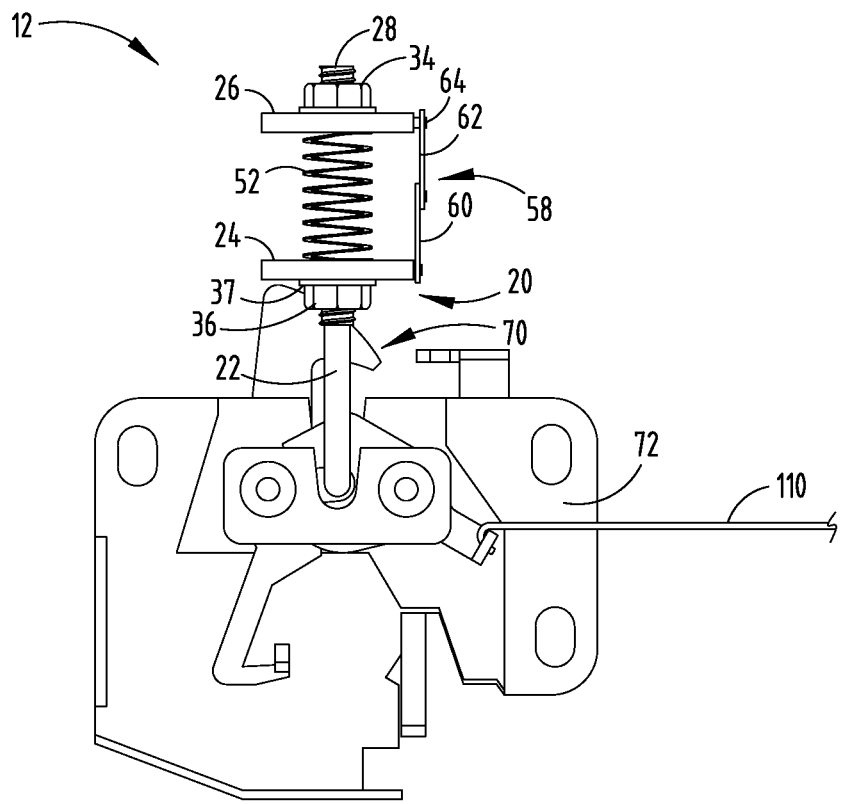
FIG. 5B is an elevated front view of the safety system in the deployed state.

Referring now to the embodiment illustrated in FIGS. 3A and 3B, the lift mechanism 12 includes a latch mechanism 70 that is capable of engaging a striker 20 to place the hood 18 in the secured position. The latch mechanism 70 is operably connected to a cable 110 that allows a user to manually release the striker 20 from the latch mechanism 70, thereby allowing the hood 18 to be moved to the unsecured position. The latch mechanism 70 is operably coupled to a frame plate 72 that is mechanically secured to a front region of the automobile 10.

Figure 7:
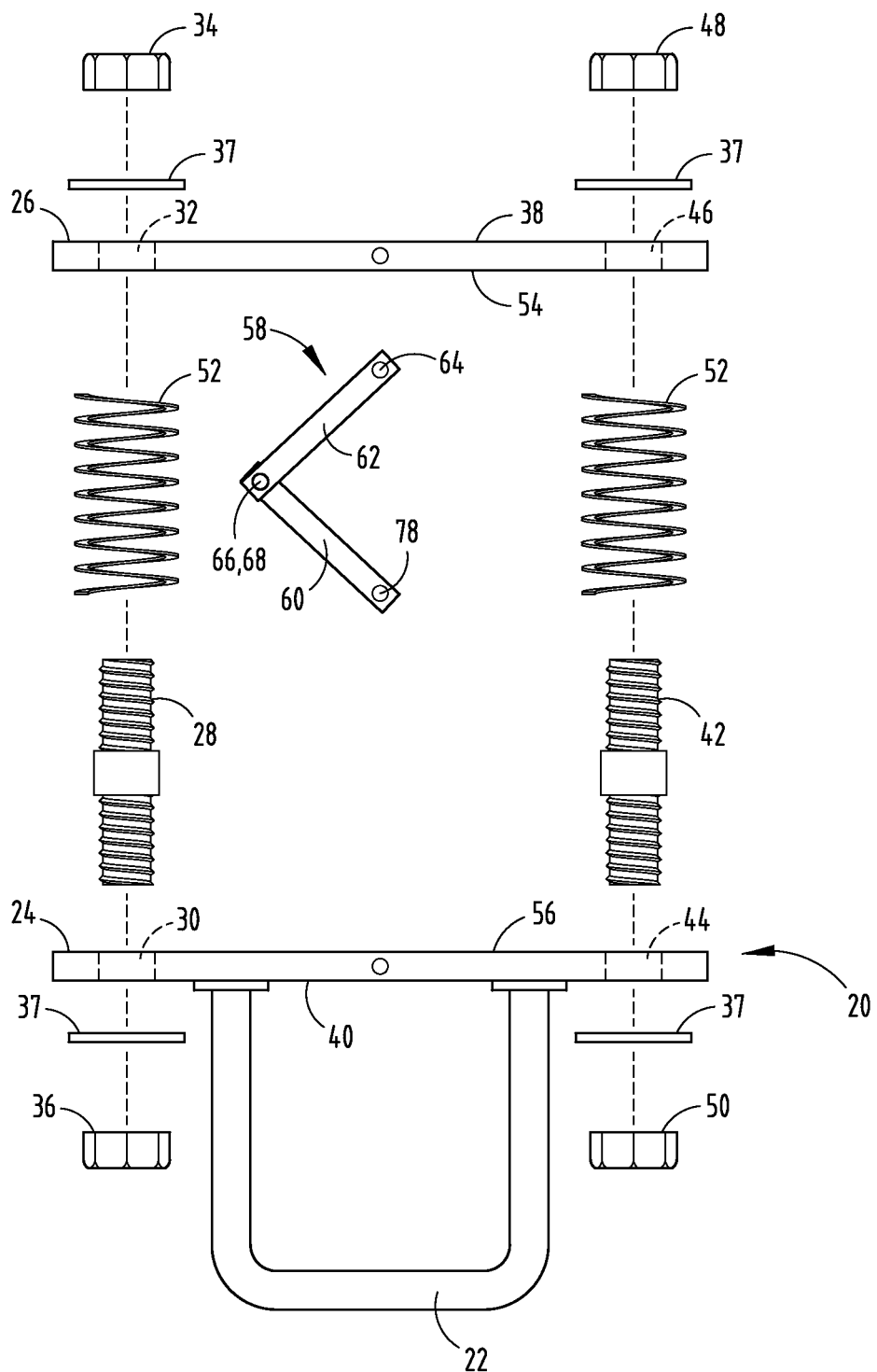
FIG. 7 is an elevated, side, exploded view of the safety system.

Referring to FIG. 7, the striker 20 includes a striker base 24 and a striker pin 22. The striker pin 22 typically is configured in a substantially U- or C-shaped geometry that extends downwardly and away from the striker base 24. The striker base 24 is typically of a substantially planar geometry having a bottom surface 40 and a top surface 56. The overall striker 20 is operably connected to a mounting plate 26 that is fixedly secured to an underside of the hood 18. The mounting plate 26 is of a generally planar geometry and includes a top surface 38 and a bottom surface 54. Additionally, the mounting plate 26 includes one or more apertures 32, 46 extending completely from the mounting plate top surface 38 to the mounting plate bottom surface 54. Similarly, the striker base 24 includes one or more apertures 30, 44 extending completely from the striker base top surface 56 to the striker base bottom surface 40.

As described above, the striker 20 is operably coupled to the mounting plate 26 via one or more fasteners. In the illustrated embodiment, the fasteners may be one or more exploding bolts 28, 42. The first exploding bolt 28 may be positioned within the first aperture 30 of the striker base 24, as well as the first aperture 32 of the mounting plate 26. Surrounding the first exploding bolt 28 is a compression spring 52, with the compression spring 52 substantially disposed between, and sandwiched by, the bottom surface 54 of the mounting plate 26 and the top surface 56 of the striker base 24. The first exploding bolt 28 secures the fastening of the striker 20 to the mounting plate 26 via washers 37 located on the top surface 38 of the mounting plate 26, as well as the bottom surface 40 of the striker base 24, and a first top nut 34 located proximate the top surface 38 of the mounting plate 26, as well as a first bottom nut 36 located proximate the bottom surface 40 of the striker base 24. As an additional fastening measure, the second exploding bolt 42 is positioned within the aperture 46 of the mounting plate 26, as well as the first aperture 44 of the striker base 24. Surrounding the second exploding bolt 42 is a compression spring 52, with the compression spring 52 substantially disposed between, and sandwiched by, the bottom surface 54 of the mounting plate 26 and the top surface 56 of the striker base 24. The second exploding bolt 42 secures the fastening of the striker 20 to the mounting plate 26 via washers 37 located on the top surface 38 of the mounting plate 26, as well as the bottom surface 40 of the striker base 24, and a second top nut 48 located proximate the top surface 38 of the mounting plate 26, as well as a second bottom nut 50 located proximate the bottom surface 40 of the striker base 24.

In addition to securing the striker 20 to the mounting plate 26 via the first and second exploding bolts 28, 42, a hinged connector 58 provides flexible connection between the striker base 24 and the mounting plate 26. The hinged connector 58 includes a second link 62 having a first end 64 that is securely attached to the mounting plate 26. The secure attachment of the second link 62 at its first end 64 to the mounting plate 26 may be achieved by a number of mechanical fasteners including, but not limited to, a screw, bolt, or pin. The hinged connector 58 also includes a first link 60 having a first end 78 that is securely attached to the striker base 24 via a mechanical fastener similar to that described above in the case of the secure attachment between the second link 62 to the mounting plate 26. The first link 60 is hingedly connected to the second link 62 at a second end 66 of the second link 62. The hinge connection between the first link 60 and the second link 62 at the second end 66 of the second link 62 is facilitated, at least in part, by a rotational spring 68. The hinged connector 58 is typically disposed at an edge region of the striker base 24 and the mounting plate 26, but it is envisioned that the hinged connector 58 could be disposed substantially between, and sandwiched by, the bottom surface 54 of the mounting plate 26 and the top surface 56 of the striker base 24.

Referring now to FIGS. 4A-4C, the portion of the releasing mechanism 12 comprising the striker 20 and the mounting plate 26 is shown in a fastened position facilitated by the previously described structural components. It is in this position, as well as the striker 20 being in the secured engagement position with the latch mechanism 70 (not shown), that the hood 18 is in the secured position where hard points between the hood 18 and the engine or automobile body exist, posing a heightened danger to a pedestrian 16 in the event of a collision. In order to provide clearance between the hood 18 and the engine or automobile body, thereby reducing the risk of injury to a pedestrian 16, the exploding bolts 28, 42, in response to a specified signal from the sensor 14, explode, thereby at least in part eliminating the secure attachment between the striker base 24 and the mounting plate 26. In this manner, the mounting plate 26, and therefore the hood 18, lift up and away from the striker 20, based on the expansion force provided by the compression springs 52, the rotational spring 68 of the hinged connector 58, or both, as illustrated in FIGS. 5A-6C.

Explosion of the bolts 28, 42 lifts the hood 18, however, a connection between the striker 20 and the mounting plate 26 still exists based on the hinged connector 58 that prevents complete disconnection. Therefore, the hood 18 is only permitted to lift at its front region a predetermined distance based on the configuration of the hinge connector 58. This distance is flexible and may be determined in a manner suitable for the automobile configuration.

The embodiment previously described in FIGS. 3A-7 provides the ability to lift a front region of the hood 18, employing a relatively small package space, while also conveniently and simply requiring replacement of the exploding bolts 28, 42 after deployment during a collision.

Figure 8:
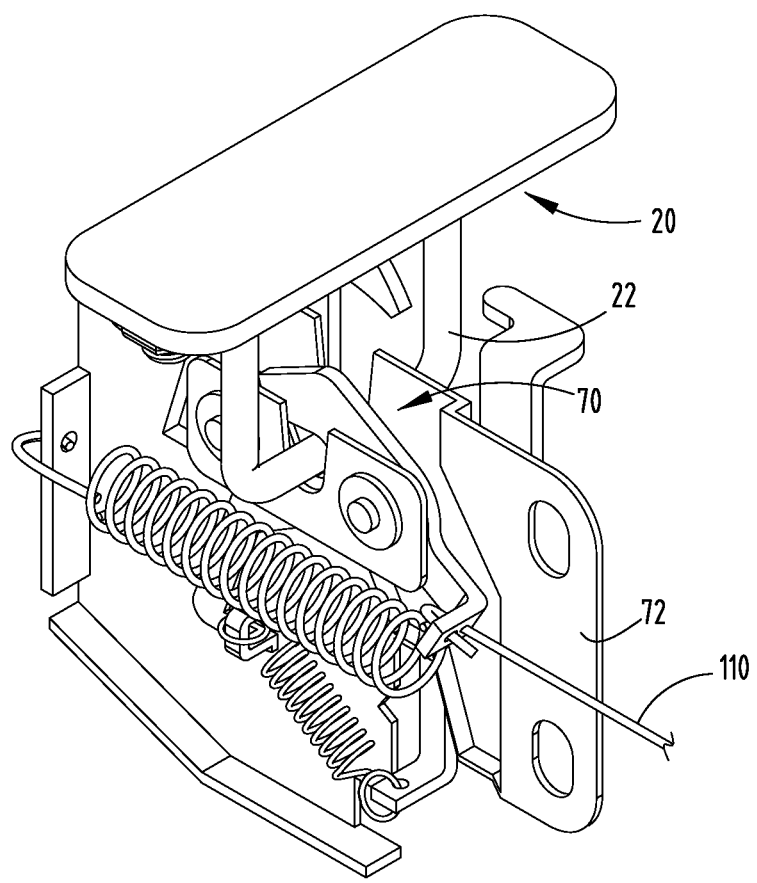
FIG. 8 is a front perspective view of a second embodiment of the automobile or pedestrian safety system.

Referring now to the embodiment illustrated in FIG. 8, a latch mechanism 70 and striker 20 for engaging the latch mechanism 70 are illustrated. Similar to the embodiment previously described, a cable 110 is operably connected to the latch mechanism 70 for manually releasing the striker 20 to open the hood 18 to an unsecured position.

Figure 9A:
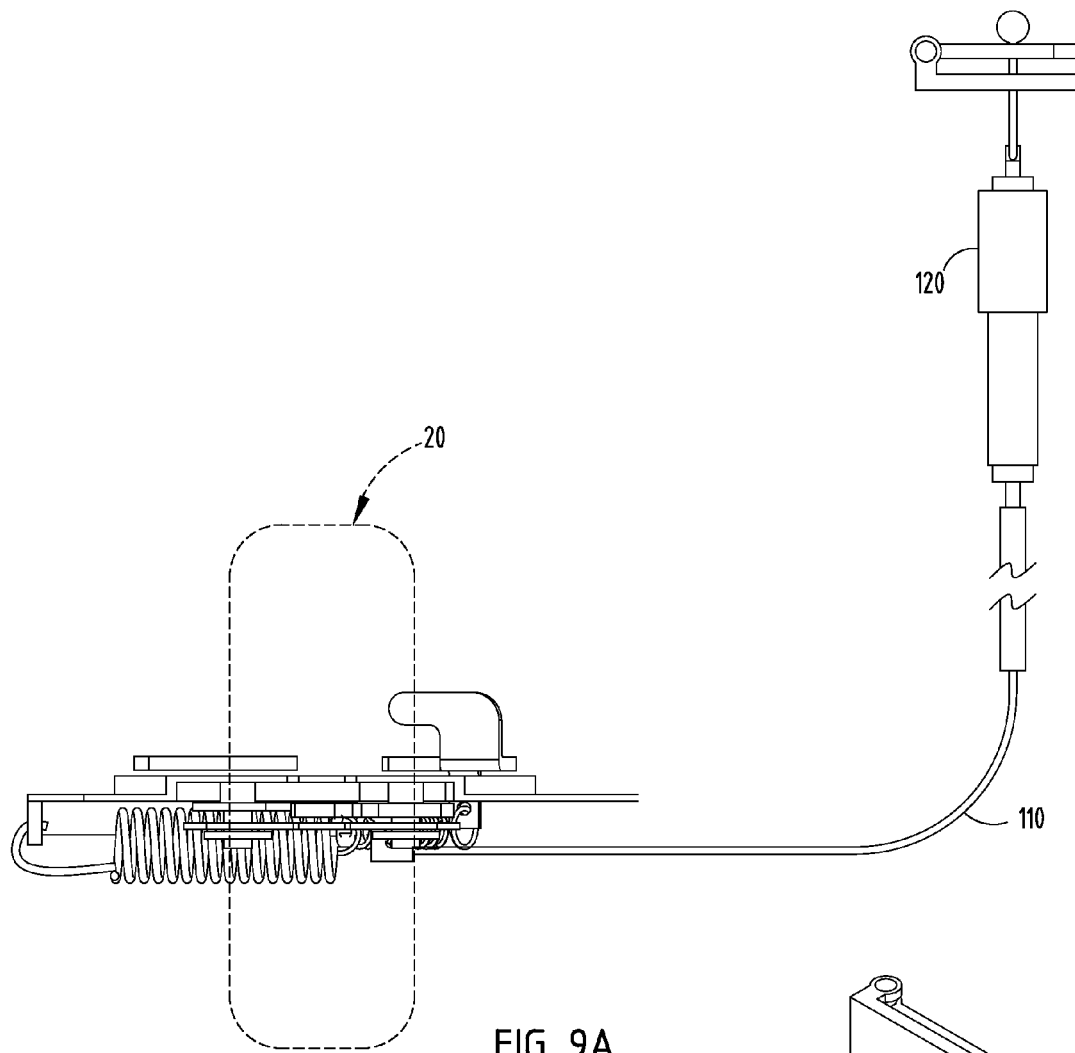
FIG. 9A is a top plan view of the safety system having a cable routed through an actuator.
Figure 9B:
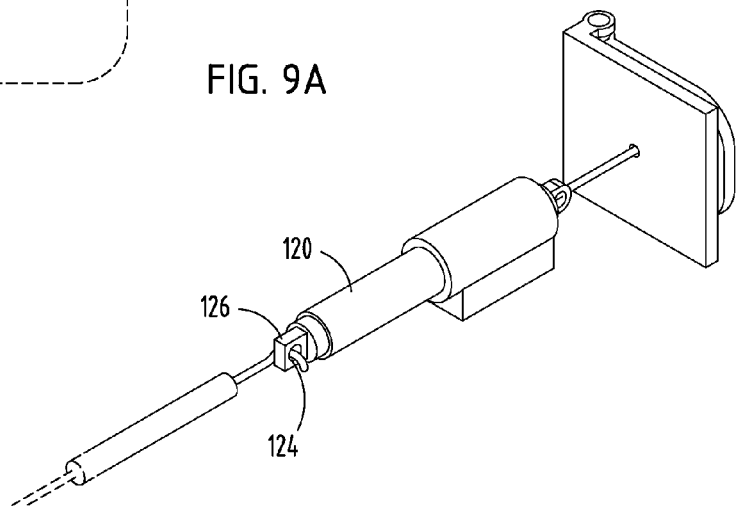
FIG. 9B is a front perspective view of the cable having a first operable connection configuration to the actuator.

Referring now to FIGS. 9A and 9B, rather than employing exploding bolts to lift a front region of the hood 18 in the event of a collision detected by the sensor 14, a linear actuator 120 is configured to receive such a signal from the sensor 14. In such an event, the linear actuator 120 is operably connected to the cable 110 that is capable of releasing the latch mechanism 70. The operable connection between the linear actuator 120 and the cable 110 may be achieved in any number of ways. As seen in FIG. 9A, the cable 110 may route through the actuator 120 along the actuator's longitudinal axis. Alternatively, as illustrated in FIG. 9B, the cable 110 may be routed through a connector 126 of the actuator 120, where the connector 126 includes an aperture 124 that the cable 110 is permitted to pass through.

Figure 10A:
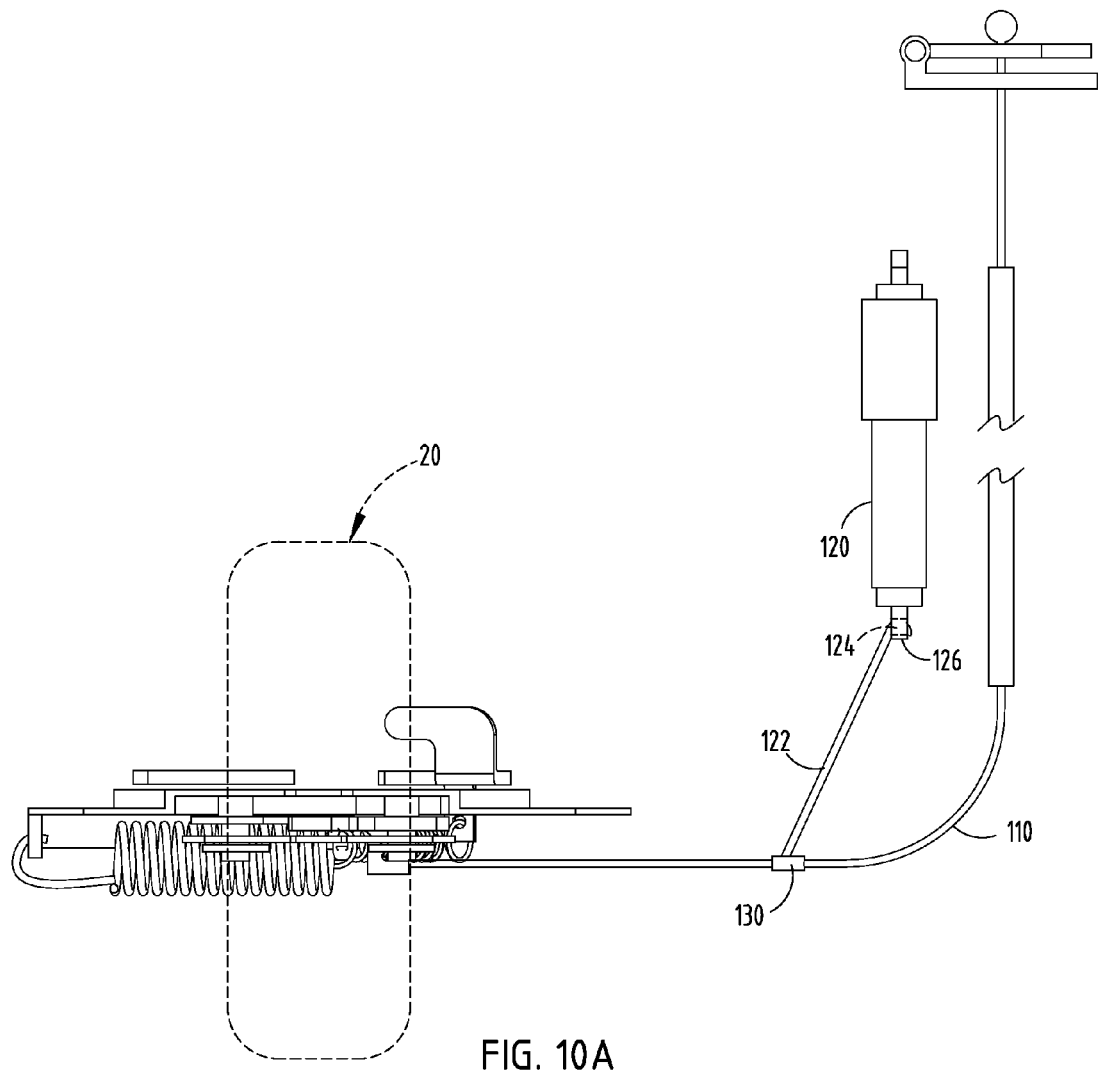
FIG. 10A is a top plan view of the cable having a second operable connection configuration to the actuator.
Figure 10B:
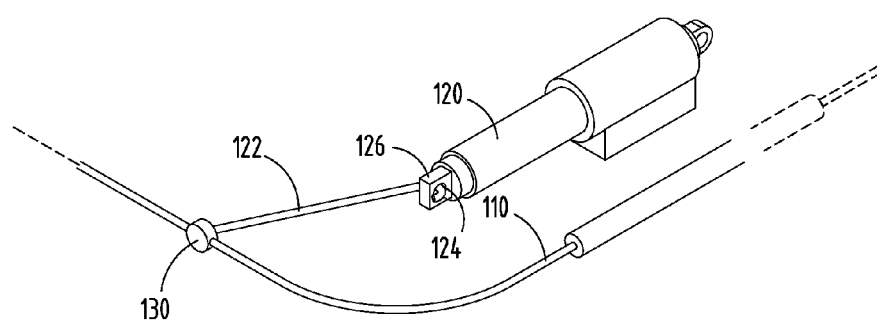
FIG. 10B is a front perspective view of the cable having the second operable connection configuration to the actuator.

Referring now to FIGS. 10A and 10B, the cable 110 may include a secondary cable portion 122 that splices off from the cable 110 at a position 130. The secondary cable portion 122 that splices away from the cable 110 may be operably connected to the actuator 120 in a manner similar to that described above. Specifically, the secondary cable portion 122 may be routed through an aperture 124 of the connector 126. Other connections between the secondary cable portion 122 and the connector 126 are conceivable.

Figure 11A:
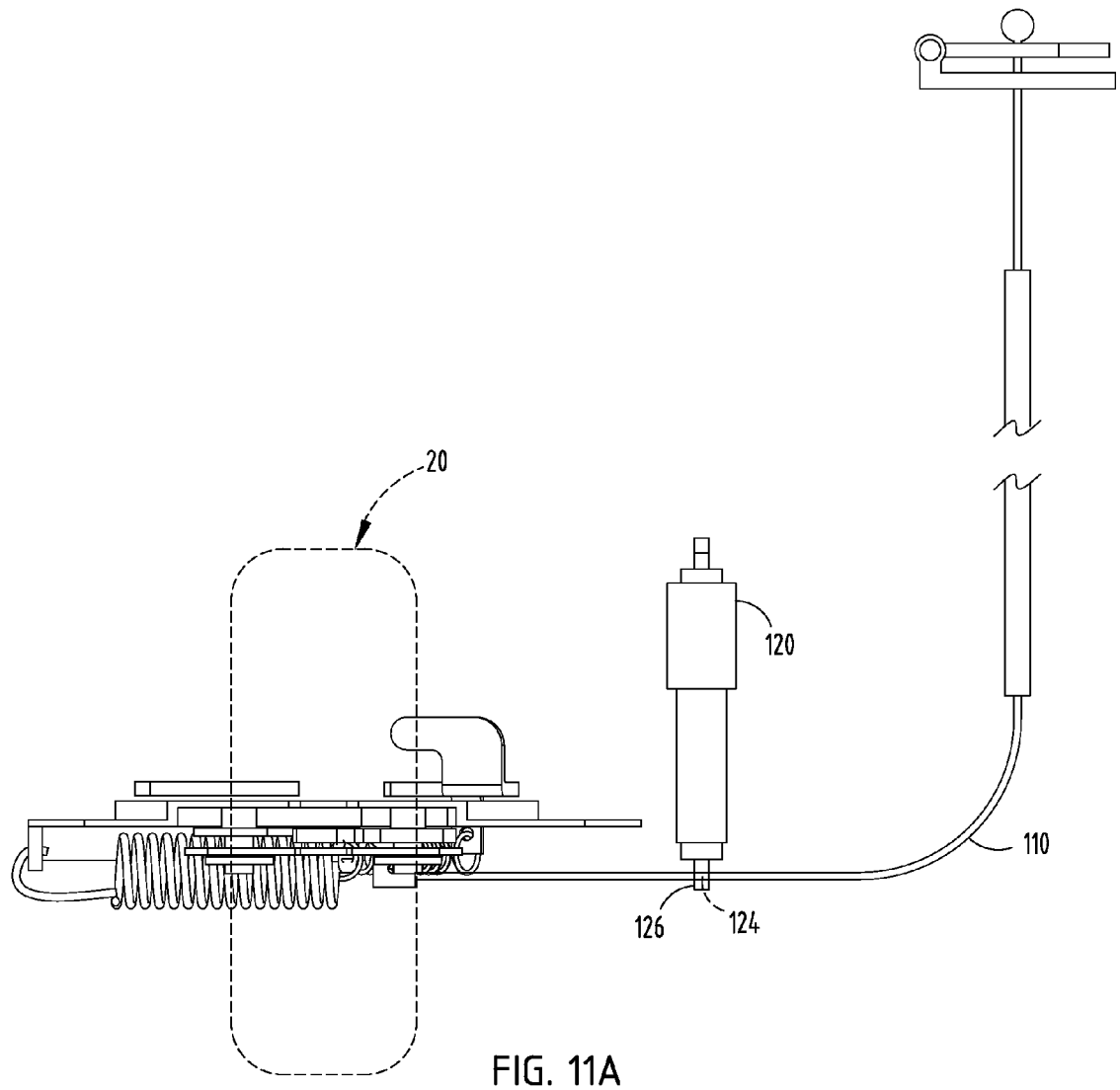
FIG. 11A is a top plan view of the cable having a third operable connection configuration to the actuator.
Figure 11B:
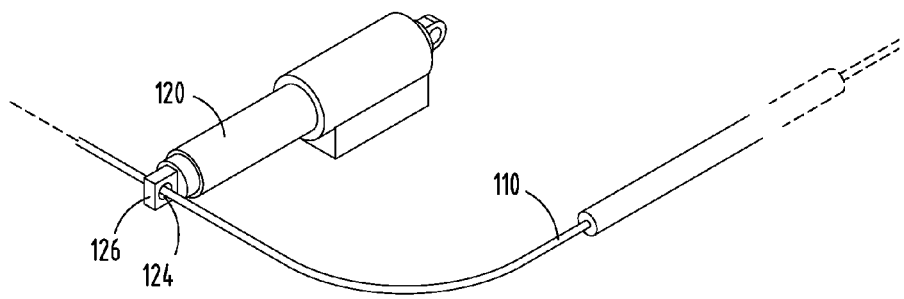
FIG. 11B is a front perspective view of the cable having the third operable connection configuration to the actuator.

Referring now to FIGS. 11A and 11B, yet another actuator 120 configuration is illustrated. Here, the actuator 120 is aligned perpendicularly to the cable 110 with a connection similar to that described above through the connector 126. It should be noted that the configuration of the actuator 120 and the cable 110 are variable to any number of positions. The configurations illustrated and described above are merely exemplary configurations, but it should be appreciated that the actuator 120 may be angled or connected with respect to the cable 110 in any way that permits operation of the actuator 120, upon receiving a signal from the sensor 14, to repeatedly and reliably pull the cable 110 with sufficient force to release the striker from the latch mechanism 70.

Simultaneous to the release of the striker from the latch mechanism 70, the hood 18 will lift upwards due to the spring force of the latch mechanism 70. In the event where the lifting time or the lift-up distance is insufficient due to inadequate spring force in the latch mechanism 70, additional pop-up spring is added to the releasing mechanism 12.

Similar to the first embodiment discussed, the embodiment employing an actuator 120 takes up little or no additional packaging space, while conveniently allowing deployment of the releasing mechanism 12 repeatedly and reliably without the replacement of additional parts and avoiding damage to any additional automobile components.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An automobile having a pedestrian safety system comprising:
    a hood having a striker proximate a front location of the hood;
    a sensor located proximate a front location of the automobile that detects impact with a pedestrian;
    a latch for engaging the striker;
    a first cable operably connected to the latch for manually releasing the striker; and
    an actuator for pulling the first cable in response to a signal from the sensor to release the striker, wherein the actuator is a linear actuator having an operable connection to the first cable, and wherein the first cable is routed through the linear actuator.

2. The automobile having a pedestrian safety system of claim 1, wherein the first cable is routed through the linear actuator in an alignment substantially through a longitudinal axis of the linear actuator.

3. The automobile having a pedestrian safety system of claim 1, wherein the actuator is fixedly secured to the vehicle body.

4. An automobile having a pedestrian safety system comprising:
    a hood having a striker proximate a front location of the hood;
    a sensor located proximate a front location of the automobile that detects impact with a pedestrian;
    a latch for engaging the striker;
    a first cable operably connected to the latch for manually releasing the striker; and
    an actuator for pulling the first cable in response to a signal from the sensor to release the striker, wherein the actuator is a linear actuator having an operable connection to the first cable, and wherein the operable connection of the first cable to the linear actuator comprises the first cable passing through an aperture of the linear actuator.

5. The automobile having a pedestrian safety system of claim 4, wherein the aperture of the linear actuator is located proximate a first end of the linear actuator.

6. The automobile having a pedestrian safety system of claim 5, wherein a longitudinal axis of the linear actuator is substantially perpendicular to a longitudinal direction of the first cable at the operable connection of the linear actuator and the first cable.

* * * * *